Patented July 7, 1925.

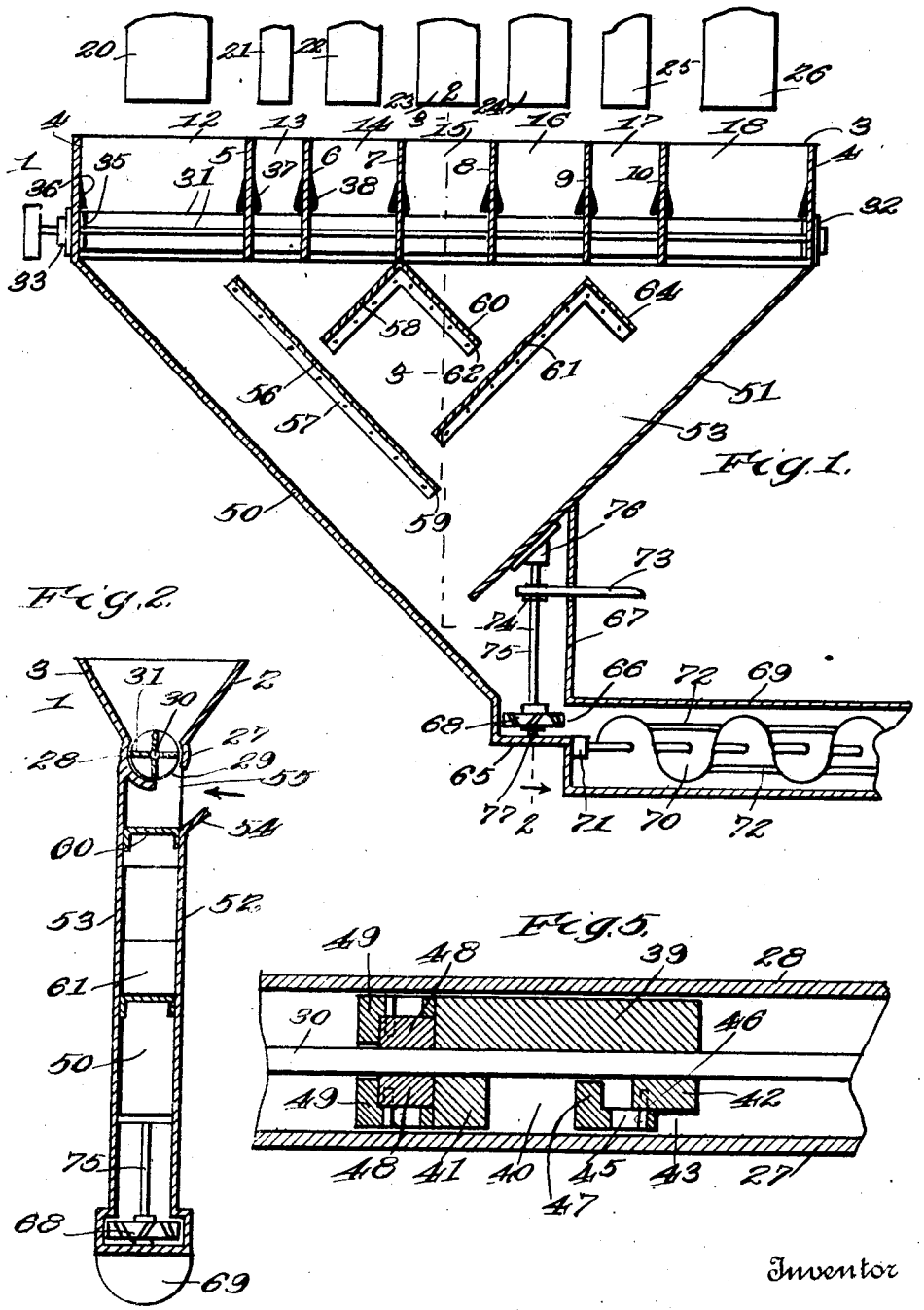

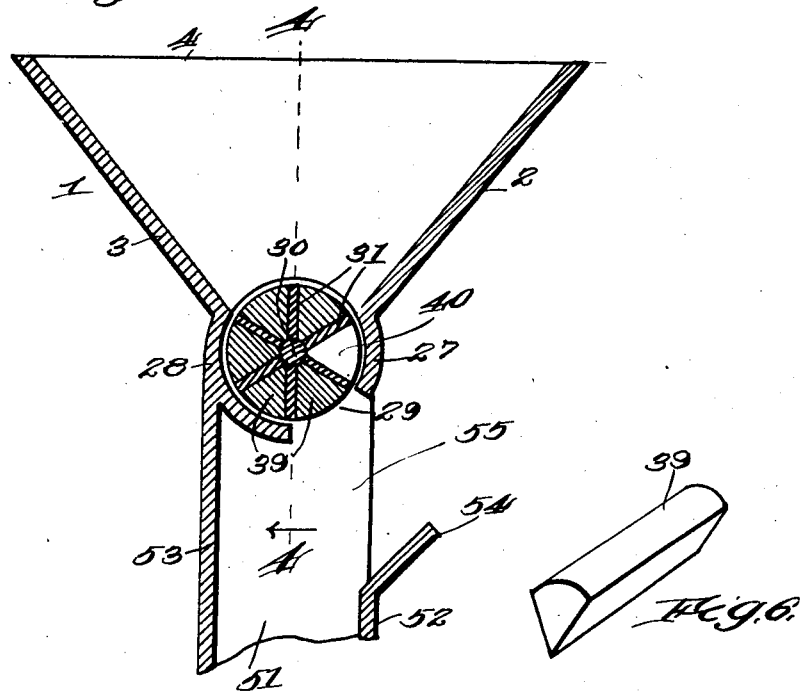

1,544,765

UNITED STATES PATENT OFFICE.

JOHN C. LAWRENCE, OF PUYALLUP, WASHINGTON.

APPARATUS FOR PREPARING POULTRY-FEED MIXTURES.

Application filed April 19, 1921, Serial No. 462,531. Renewed May 26, 1925.

*To all whom it may concern:*

Be it known that I, JOHN C. LAWRENCE, a citizen of the United States, residing at Puyallup, in the county of Pierce and State of Washington, have invented new and useful Improvements in Apparatus for Preparing Poultry-Feed Mixtures, of which the following is a specification.

This invention relates to an improved method and means for producing a poultry feed mixture in which all of the ingredients are at all times accurately blended.

In recent years, experimental stations and progressive poultry men have determined, subject to actual proof, that the physical egg producing organism of a hen will respond with the maximum efficiency of egg production only when the egg producing feed is absolutely uniformly proportioned as regards its various ingredients. This fact is wholly additional to the well known requirements of housing, regular feeding and other requirements with which this invention has nothing to do. In actual practice, a poultry feed consisting of bran, red dog (a low grade of flour), meat and bone meal, corn meal, soy bean meal, fish meal and charcoal, consisting of seven ingredients, a feed in which I have had extensive experience in producing, the poultry men can quickly determine if an ingredient having a protein or fiber content has been supplied to the mixture in excess of the desired proportion, or in less than the desired proportion, as any such variation will materially reduce egg production.

Because of the fact that out of a ton of mixture, the proportion that each hen will eat at one ration, as compared to the whole, will be relatively small, it will be obvious that it is not only necessary to accurately proportion the ingredients, but also to so thoroughly blend the mixture throughout the mass, that either a table spoonful, or a bushel of the ton of mixture, will each accurately contain not only the exact proportion of ingredients, but also, and most essential, all of the ingredients. This factor of accuracy of ingredient content and thorough blending has become so insistent that those engaged in the supply of this character of feed are now facing a problem, which so far as I am aware, has not yet been solved. It must be remembered that each carload of bran, for instance, will have a different specific gravity or test weight per Winchester bushel. Also its particular contribution of food or other content will vary. Hence it is not enough that all these ingredients forming the feed mixture are merely combined and mixed in true proportions with respect to each other as regards mere volume. They must, on the other hand, be so accurately blended that the feed content of the finished mixture will be uniform as regards the whole mixture by weight and also as regards the feed contribution of each ingredient.

Therefore, it is a feature of my improved method to first analytically and scientifically determine in each new carload or other lot, both the specific gravity and the particular feed or other content of each ingredient and then accordingly to deliver all the ingredients separately and preferably simultaneously into a single chamber wherein the ingredients are so thoroughly mixed that in the finished feed mixture, irrespective of mere volume, the collected and mixed ingredients will total, in weight, and in the several feed content requirements just to what has been predetermined that such mixture should conform.

It is a feature of the apparatus phase of my invention, to provide a series of measuring devices, one for each ingredient, and each device being individually adjustable to make delivery of its respective ingredient in that proportion to the whole, with respect to the feed supplying content, irrespective of variation in volume. I have found in practice that weight, is the controlling factor, by means of which I can control the feed content irrespective of variation in bulk of the material.

It is a further feature of my invention to actively mix these ingredients immediately after and preferably while the same are being discharged from the measuring devices, and in the prefered construction, I first mix a plurality of groups of ingredients, first with each other, and consecutively or later, with another group of ingredients previously mixed, the consecutive mixtures finally being combined in substantially perfect proportions because of this consecutive blending operation.

It is also a feature of my invention to mix the group of ingredients of heavier specific gravity and lesser bulk, with each other before the ingredients are mixed with the ingredients of greater bulk and lighter specific gravity.

My invention has many other objects and features which will be more fully described in connection with the accompanying drawings and which will be more particularly pointed out in and by the appended claims.

In the drawings:

Figure 1 is a vertical sectional view of one form of my complete apparatus whereby my improved method may be carried out.

Figure 2 is a vertical sectional view on line 2—2 of Figure 1.

Figure 3 is an enlarged sectional view on line 3—3 of Figure 2, this section line intersecting a portion of line 2—2.

Figure 4 is a sectional view on the same scale as Figure 3 and taken on line 4—4 thereof.

Figure 5 is a sectional view on line 5—5 of Figure 4.

Figure 6 is a detail view of one of the non-adjustable filler strips.

Like characters of reference designate similar parts throughout the different figures of the drawings.

A measuring structure is generally designated at 1, the same being in the form of a linearly elongated hopper having front and rear diverging walls 2 and 3, and end walls 4. This measuring structure is divided by partitions 5 to 10 into a series of compartments 12 to 18. I have indicated supply chutes at 20 and 26, one for each of said compartments. The walls 2 and 3 of said measuring structure are rounded at 27 and 28, as will be seen by reference to Figure 2, the wall 28 terminating at the vertical axis of said structure and the wall 27 terminating somewhat laterally of said axis thereby providing for a lateral discharge from the compartment. The discharge portion or opening of compartment 12 is indicated at 29 and each of said compartments will have a similar discharge portion.

Each compartment has a measuring device, and as shown, all of said devices are preferably formed from a unitary rotor or rotating device which extends linearly throughout the length of the measuring structure. Said device includes a shaft 30 having radially extending blades 31 which are co-extensive in length with respect to the length of the measuring structure, said blades being of equal number and being uniformly circumferentially spaced apart throughout all the compartments. The shaft 30 is suitably journaled in the end walls in bearings 32 and 33, and means is provided which may consist of a pulley 34 for imparting rotation to said shaft from any suitable source of power.

At each extreme end, the blades 31 are thereby preventing the contents of the V-shaped cavities from discharging endwise and possibly clogging against the end walls. As a further preventative, the end walls are provided with deflectors 36 which overhang the ends of the rotor thereby preventing the material from wedging between the rotor and the compartment walls. Intermediate partitions are likewise laterally flared as indicated at 37 and 38, in Figure 4.

The rotor provides a series of V-shaped cavities coextensive in length with each compartment and if the contents of each compartment freely filled all the cavities, without any capacity reduction means, it would be impossible to get any kind of accurate measurement discharge. Therefore, I will now refer to an important feature of my invention which consists in means for reducing the containing capacity of individual cavities to a very minute degree of accuracy thereby enabling me to measure the quantity of ingredients in absolute accordance with the proportions upon which I have initially determined. As all of the means is similar in structure and formation except in the matter of mere length, a description of one will suffice for all.

Now referring to compartment 13, I employ filler blocks 39 which completely fill all the cavities except that indicated at 40. This cavity is not permitted to present its full containing capacity to the material but is reduced by block 41, which is a fixed reduction, at one end thereof. At the other end of said cavity is a fixed block 42 having a mortice 43 therein. A tenon member 44 is slidably adjustable in said mortice and its adjustment is shown to be fixedly limited by a slot and screw in pin construction 45 and 46. The tenon member has an L-portion 47 which completely fills the cross section of the cavity.

Now it will readily be seen that as this adjustable or tenon member is adjusted to the right or left of Figure 5, the containing capacity of said cavity 40 may be altered by being either enlarged or contracted to the most minute degree. At each revolution of the rotor, the latter would only carry and permit of discharge of that quantity of material which could gain access into said cavity, the remaining peripheral portion of the rotor within compartment 13 being entirely flush. In practice, the contents in compartment 13 will be meat and bone meal and a relatively very small proportion of this ingredient will be utilized as compared to the proportion of bran in compartment 12. Thus in the latter instance I do not employ any fixed filler blocks 39 but each cavity is provided with adjustable mortice and tenon members 48 and 49 which are tenon members 42 and 44, just described. The bran being of a very light specific gravity and of large bulk, I find the best results can be obtained by individually regulating each cavity to diminish its containing capacity as the tests require. Thus each of the bran cavities will be active although they may be adjustably varied in containing capacity. Therefore it will now be clear that while the rotor, in skeleton form is uniformly the same throughout all the compartments, it is provided with means whereby in each compartment there will be a measuring device which may be individually adjusted to the individual requirements of delivery of each ingredient. Because of the fineness and accuracy of adjustment which this means renders possible, I only have to employ a single speed of rotation and consequently my device is thereby simplified by only requiring one driving connection.

I will next describe the means of mixing the several ingredients as the same are delivered from the measuring device.

As illustrated, 50 and 51 designate converging hopper end walls which are united with parallel front and rear walls 52 and 53. This forms a hopper structure into which all of the measuring devices discharge. Wall 52 is interrupted at 54 to provide an inspection opening 55 which is coextensive with the measuring device thereby enabling the miller to inspect the action of the measuring device. Thus if any one or more of the devices were not working, this fact could be readily determined.

It is a feature of my invention to blend the ingredients in such a complete manner that a substantially perfect mixture will result. Consequently, and especially because the ingredients have a wide variety of specific gravity, I do not wish to rely upon the converging walls 50 and 51 to completely blend the ingredients as far as mixture is concerned. Consequently I provide supplemental means which acts consecutively upon the various groups of ingredients to first mix the ingredients of one group and later form a mixture of other groups prior to the total mass coming into a collective mixture.

As shown, 56 designates a deflector which is of U shaped construction and which extends across the space from walls 52 and 53, to which its flanges 57 are secured. This deflector extends at an inclination subjacent to compartment 13, thereby serving to deflect the fall of this ingredient laterally to the right of Figure 1. A deflector 58 extends subjacent to compartment 14 and serves to deflect the contents thereof directly onto deflector 56 at a point upwardly from the discharge end 59 thereof. Thus there will be a preliminary mixing of the contents of compartments 13 and 14. Deflector 58 has a deflector 60 extending subjacent to compartment 15. A deflector 61 extends subjacent to compartment 16 and past the discharge end 62 and discharges onto deflector 56. Thus the contents of compartments 15 and 16 will be subjected to a mixing action, and the discharge from deflector 56 will mix the contents of compartments 13 and 14 with that of 15 and 16, the mixture thereafter discharging off from end 59 toward wall 51. It will be noted that the bran is not interrupted in its flow downwardly along wall 50 and that as the mixture discharges off from end 59 it will comingle with the bran and charcoal, with which these previously blended ingredients will the more readily be comingled and distributed. Deflector 61 has a deflector 64 which will shift the contents of compartment 17 into mixing relation with that of compartment 18, both descending on wall 51 and discharging upon the bran against wall 50 subsequent to the previous comingling of the bran with the other ingredients hereinbefore referred to.

The importance of having a complete mixture, in addition to an accurate proportioning of the ingredients will now be clear.

The mixing hopper device has a blind bottom 65 provided with a laterally disposed discharge opening 66, a wall 67 joining wall 51. In this outlet, I interpose a bladed wheel 67, the function of which is to thoroughly comingle the several kinds of particles as they descend outwardly through the opening 66. Thus the several reversals of travel, in addition to the device 67, will act very effectively to perform the desired function.

It is necessary to convey the finished mixture to the desired point of deposition and I therefore utilize a conveying mechanism which additionally functions to add to the intensively mixing expedients hereinbefore referred to.

In practice, the opening 66 delivers to a conveyor pipe 69 having an auger conveyor 70, therein, one bearing being indicated at 71. The blades of the auger may be provided with stirring rods 72, which, in addition to the mixing action of the auger will serve to interrupt and vary the path of progress of the feed mixture and thereby increase the dispersion of particles thereof. The auger may be driven in any desired manner, not shown. A belt 73 extends through wall 68 and is trained about a pulley 74 on shaft 75, on which wheel 67 is mounted. Bearings 76 and 77 suitably journal said shaft 75.

The foregoing will, it is believed, render the structure and its operation entirely clear, and I will now devote the remaining portion of the description to a more detailed consideration of the operation and its advantages with respect to one combination of ingredients.

I will first generally describe the feed characteristics of the several ingredients of the particular mixture that I now employ. For instance, bran will constitute nearly 75 per cent of the bulk and approximately 50 per cent of the weight of the mixture. Bran is employed not only because of its nutriment supplying qualities but also for the bulk it imparts to the mixture. The meat and bone meal is of course a nutriment ingredient and its bulk would be relatively small compared to the bran, say about three per cent whereas in weight it would be ten per cent of the bran. Now this meat and bone meal is reduced to approximately the granular consistency of coarse sand and by reason of the fact that it is thoroughly dried it will flow as freely as sand. Corn meal is a nutriment ingredient and its relative bulk will exceed that of the meat and bone meal and as its general characteristics are well known, it need not be described in detail. Its bulk will be, as compared to bran, approximately eight per cent whereas its weight as compared to the bran would be about twenty-five per cent. Red dog, which is a low grade of flour, need not be specifically described as regards is characteristics but its bulk as compared to bran would be about ten per cent whereas its weight would be about twenty-five per cent. This is a nutriment ingredient. Flour has a well known tendency to pack and not either feed or discharge uniformly or freely but I will provide this measuring device with a highly finished surface and will so control the feed to this compartment as to overcome any tendency of this proportion or inaccuracy. Soy bean meal, a nutriment ingredient, being the ground bean, thoroughly dried, has the general characteristics of coarse corn meal and its bulk will be about seven per cent of the bran whereas its weight will be about twenty per cent. Fish meal, which is a nutriment ingredient, is similar to meat and bone meal and is thoroughly dried so that it is freely granular. It is well known that there are two kinds of fish meal, one being edible and the other the fertilizing, and of course I use the edible. In bulk the fish meal would be about four per cent of the bran and its weight would be about seven per cent. Charcoal is a gas absorbent or neutralizing ingredient the function of which is wholly to correct digestive disorders. The charcoal is reduced to approximately a number six to eight guage mesh and in bulk would be about five per cent of the bran and in weight about five per cent.

The foregoing is general information given for the benefit of the public when the patent issues but no attempt has been made to intensively specify these characteristics of the ingredients for the reason that no claim is now addressed to the mixture per se. However, the foregoing will illustrate and make clear the significance and advantage of the supplemental mixing means whereby certain groups of ingredients are first mixed with each other, and then later mixed with a remote group of ingredients prior to the comingling of these ingredients with bran and the charcoal. Both the bran and the charcoal lend themselves very readily to a most complete mixture and because of the fact that their proportionate bulk is very great compared to all the other ingredients, it will now be clear why the charcoal and the bran are not interrupted or arrested in their descent downwardly along the hopper walls 50 and 51.

In the present arrangement of the preliminary mixing devices or deflectors, I have laid the foundation for one selective mixing operation which may not itself be always adhered to. Therefore, the main features which I desire to assert is that I subject those ingredients of a heavier specific gravity to a preliminary mixing operation before they comingle with the bran and charcoal, the two ingredients of lightest specific gravity.

It will be noted that as the bran and charcoal are of the lightest specific gravity, and larger in bulk, they require more time to descend than the materials of less bulk and greater specific gravity. Thus by arresting the materials of greater specific gravity, by this preliminary mixing, I prevent the precipitate drop of these materials so far in advance of the bran and charcoal as to retard thorough mixing. Otherwise, the heavier materials would precede the lighter materials not only at the beginning but throughout the operation.

By the time the mixture passes through the wheel 67 and the conveyor, a most thorough dispersion of the particles will have been effected with a view of making each hen's ration uniform in its relative content of all the ingredients.

It is believed that my invention will be fully understood from the foregoing description and I do not wish to be limited thereto except for such limitations as the claims may import.

I claim:—

1. An apparatus for forming a poultry feed mixture with the ingredients blended in accurate weight proportion with respect to previous test weight per Winchester bushel of each ingredient, comprising combination, a plurality of rotating measuring devices, one for each ingredient of the mixture, and said devices being individually adjustable and rotatable in unison to deliver their respective segregated quota of ingredient in specific bulk proportion to the whole mixture to retain the proportions in accordance with such previous test weight, and means for receiving and mixing the separate ingredients delivered from said devices to form the predeterminedly balanced feed mixture.

2. An apparatus for forming a poultry feed mixture with the ingredients blended in accurate weight proportion with respect to previous test weight per Winchester bushel of each ingredient, comprising in combination, a plurality of measuring devices, one each for each ingredient of the mixture, and said devices being arranged to deliver their respective quotas of ingredients in specific and segregated bulk proportion to the whole mixture to retain the proportions in accordance with such previous test weight, and apparatus for first mixing separate segregated groups of ingredients delivered from said device and finally mixing all of the ingredients to form a balanced mixture.

3. An apparatus for forming a poultry feed mixture with the ingredients blended in accurate weight proportion with respect to previous test weight per Winchester bushel of each ingredient, comprising in combination, mechanism for measuring a plurality of ingredients of the mixture to deliver each respective ingredient quota in specific bulk proportion to the whole mixture to retain the proportions in accordance with such previous test weight, and apparatus for first consecutively mixing segregated groups of ingredients and finally mixing all of the ingredients.

4. An apparatus for forming a poultry feed mixture with the ingredients blended in accurate weight proportion with respect to previous test weight per Winchester bushel of each ingredient, comprising in combination, a plurality of receiving compartments, one for each ingredient, a rotatable measuring device in each compartment for controlling delivery from its respective compartment and each measuring device being individually adjustable to deliver its respective quota of ingredient in specific bulk proportion to the whole mixture to retain the proportions in accordance with such previous test weight, and means for receiving and mixing the separate ingredients delivered from said devices to form the predeterminedly balanced feed mixture.

5. An apparatus for forming a poultry feed mixture with the ingredients blended in accurate weight proportion with respect to previous test weight per Winchester bushel of each ingredient, comprising in combination, mechanism for measuring a plurality of ingredients of the mixture to deliver each respective ingredient quota in specific bulk proportion to the whole mixture to retain the proportions in accordance with such previous test weight, and a receiving hopper for receiving the separate ingredients from said mechanism, said hopper having a plurality of mixing deflectors for first mixing initial groups of ingredients with each other and later mixing one segregated group with another, and said hopper having a final discharge for mixing all of the ingredients together.

6. An apparatus for forming a poultry feed mixture with the ingredients blended in accurate weight proportion with respect to previous test weight per Winchester bushel of each ingredient, comprising in combination, mechanism for measuring a plurality of ingredients of the mixture to deliver each respective ingredient quota in specific bulk proportion to the whole mixture to retain the proportions in accordance with such previous test weight, a hopper for receiving and mixing the separate ingredients from said mechanism and having a single outlet, and a mixing means interposed in said outlet.

7. An apparatus for forming a poultry feed mixture with the ingredients blended in accurate weight proportion with respect to previous test weight per Winchester bushel of each ingredient, comprising in combination, a measuring mechanism comprising a plurality of compartments and a measuring device for each compartment, and each measuring device comprising a radially bladed rotor controlling discharge from its compartment and said blades forming radial pockets for receiving the ingredient and discharging the same, and means for partially filling said pockets to vary the amount of ingredient discharged therefrom, and means for receiving and mixing the ingredients discharged from said mechanism.

8. In a measuring device for an apparatus of the class described, a compartment for receiving the material and having a discharge outlet, a rotor interposed in said compartment to control discharge through said outlet and having radially disposed blades forming receiving pockets therebetween, and a filler device in one of said pockets and being adjustable longitudinally of said pocket to vary the containing capacity of said pocket.

9. In a measuring device for an apparatus of the class described, a measuring structure divided into a plurality of separate compartments, a radially bladed measuring rotor extending through all of said compartments for controlling discharge therefrom, and devices for reducing the spaces between the blades in each compartment in accordance with the predetermined measured delivery to be obtained from each compartment.

10. In a measuring device for an apparatus of the class described, a measuring structure divided into a plurality of separate compartments and each compartment having a discharge portion, a bladed measuring rotor extending through all of said compartments for controlling delivery from all of said discharge portions, means for rotating said rotor, and filler blocks for individually reducing the containing capacity between the blades of each compartment for causing a predetermined and different volume of discharge from each compartment.

11. In a mixing means of the class described a plurality of measuring devices delivering ingredients of relatively light and heavy specific gravity, a hopper structure for receiving all of said ingredients, and means in said structure for slowing up the descent of and mixing with each other the ingredients of heavier specific gravity prior to their mixture with the ingredients of lighter specific gravity.

12. In a mixing means of the class described a plurality of measuring devices delivering ingredients of relatively light and heavy specific gravity, and a hopper structure for receiving all of said ingredients and having uninterrupted portions for conveying the ingredients of lighter specific gravity, and means in said structure for slowing up and mixing the ingredients of heavier specific gravity prior to their mixture with the ingredients of lighter specific gravity.

In testimony that I claim the foregoing as my own, I hereby affix my signature.

JOHN C. LAWRENCE.